Nov. 20, 1923

J. P. WARBURG

MAGNETIC COMPASS

Filed April 24, 1919

Inventor
J. P. Warburg
By
Attorney

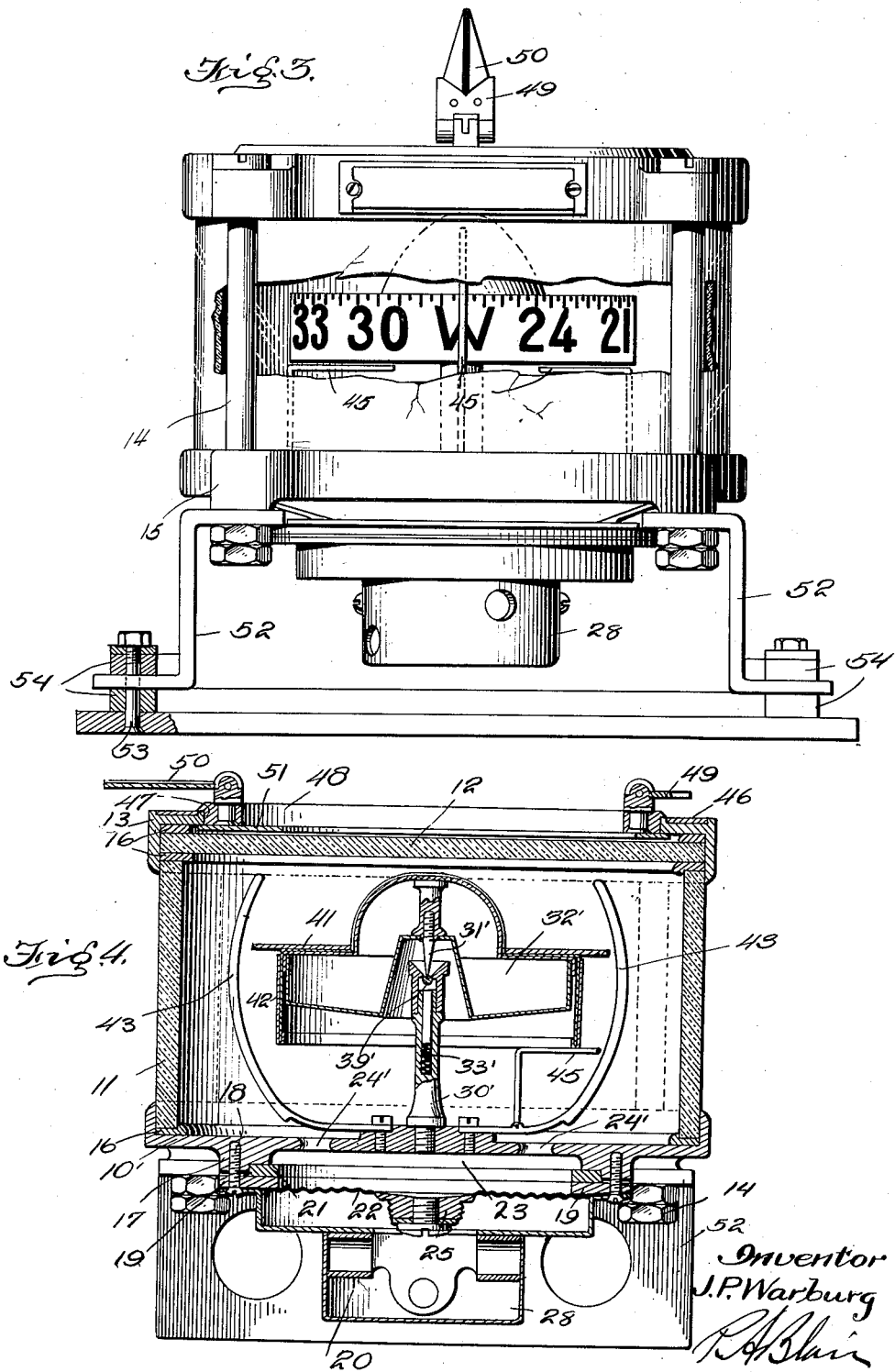

Patented Nov. 20, 1923.

1,474,394

UNITED STATES PATENT OFFICE.

JAMES P. WARBURG, OF WASHINGTON, DISTRICT OF COLUMBIA, ASSIGNOR TO GOVERNMENT OF THE UNITED STATES.

MAGNETIC COMPASS.

Application filed April 24, 1919. Serial No. 292,351.

*To all whom it may concern:*

Be it known that I, JAMES P. WARBURG, a citizen of the United States, residing at Washington, District of Columbia, have invented new and useful Improvements in Magnetic Compasses, of which the following is a specification.

This invention relates to magnetic compasses, and contemplates certain improvements therein, which particularly adapt the same for use in aeronautical work, although, of course, my improved compass may be used in nautical or land operations.

It is a purpose of the present invention to provide certain improvements in magnetic compasses whereby the pilot of an aeroplane or the like may adjust the compass, due regard being had to the direction and velocity of the wind which may cause the machine to drift, so that by following the compass, as adjusted, the pilot may head his craft in the right direction to bring him to his destination, and dismiss the matter of drift from his mind.

It is a further object of my invention to provide a compass whereby the aviator may determine the relative bearing of his craft or other object, such as a target; and which may be used as an inclinometer to indicate the angle of the craft relative to a horizontal plane.

The compass herein contemplated is simple in construction, may be manufactured at a relatively low cost, and is relatively light in weight. The arrangement and construction are such that the float carrying the compass graduations may be observed through the side or the top of the bowl containing the same, so that the compass may be read by the aviator in a sitting or standing position.

To enable others skilled in the art so fully to comprehend the underlying features of the invention that they may embody the same into the numerous modifications in structure and relation contemplated by this invention, drawings depicting two forms have been annexed as a part of this disclosure, and in such drawings, like characters of reference denote corresponding parts throughout all of the views, of which:—

Figure 3 is a side elevational view, part of the glass cylinder forming the sides of the compass bowl being broken away; and Figure 4 is a view similar to Figure 2, but illustrates a slightly different construction.

Figure 1:
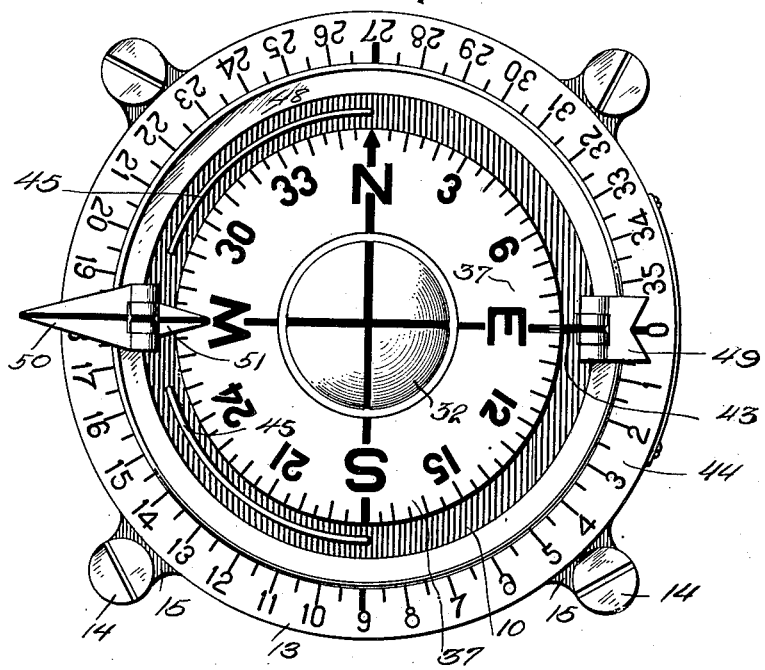
Figure 1 is a top plan view of a compass constructed in accordance with one embodiment of my invention, the top glass plate being removed.

In the drawings, the compass bowl or casing, which houses the float bearing the divisional marks or graduations indicative of the points of the compass, is illustrated as comprising, in part, a bottom plate 10, preferably of circular form, a cylinder 11 forming the sides of the bowl and constructed of glass or other transparent material, so that the float-compass may be viewed therethrough, a glass top plate 12 resting upon the upper edge of the cylinder 11, a metallic binding ring 13, L-shaped in cross section and encircling the plate 12 and the upper edge of the cylinder 11, and a plurality of bolts 14 passing through ears 15 extending radially from the bottom plate 10 and the ring 13 for tying the parts of the compass bowl in assembled position. The numerals 16 indicate packing rings for making the joints between the members of the compass bowl fluid-tight. The compass bowl is carried by legs 52, which in the present instance, are shown as sheets of metal, these legs being secured to a suitable support by bolts 53 and resilient washers 54 being employed to relieve the compass of jars and vibrations.

The bottom plate 10 has, on its under surface, an annular rib 17 to which are secured, by means of screws 18, a ring 19 and a compensating casing 20. 21 is a packing. Clamped between the ring 19 and member 20 is the edge of a corrugated diaphragm 22 which forms an expansion chamber 23 between itself and the plate 10, this chamber, in Figure 2 of the drawings, being in communication with the interior of the compass bowl by means of a centrally disposed opening 24 in the plate 10 and in that embodiment shown in Figure 4, by means of openings 24' spaced radially from the center of the bottom plate 10'. Said expansion chamber takes care of the expansion and contraction of the fluid due to temperature changes. The diaphragm may be provided with a centrally apertured bushing 25 having a through threaded opening by means of which the bowl may be filled and this opening is closed by a filling plug 26. If desired, the bottom plate 10, (see Figure 2,) may have a filling opening located outside of the rib 17 and closed by a plug 27.

The compensating casing 20 may be of any suitable type, that shown in the drawings being by way of illustration only. It will be understood by those familiar with the art, that this casing is adapted to receive correcting magnets (not shown) for compensation for outside influences tending to cause the magnetic needles of the compass float to deviate from magnetic north. The compensating casing is covered by a removable cap 28.

Figure 2:
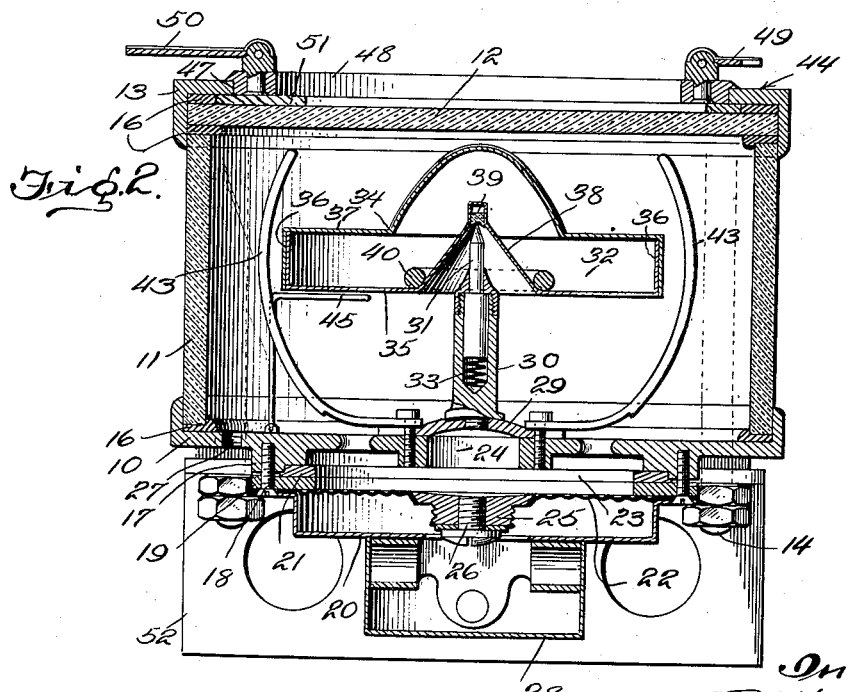
Figure 2 is a sectional view taken vertically and centrally through the compass shown in Figure 1.

In that embodiment of my invention shown in Figures 1 to 3 of the drawings, the opening 24 in the base plate 10 is bridged by a bar 29 having a threaded opening which receives a pivot post 30 carrying a needle 31 on which is pivotally mounted the float 32. For the purpose of preventing the transmittal of shocks to the float, the needle 31 rests on a coiled spring 33 carried by the post 30. The float 32 comprises a top member 34 and a bottom member 35, these members being formed of sheet metal discs and pressed to the shapes illustrated. The edge of each of these members is bent at a right angle to the body portion thereof so as to form a cylindrical flange 36. The flange of the bottom member is of slightly less diameter than the flange of the top member so that it will telescope into the latter and these flanges are secured together in a manner which will prevent the liquid within the compass bowl from gaining access to the interior of the float 32. The top member 34 has a centrally located dome portion surrounded by a ringlike flat surface 37 on which are marked the compass points and divisions, in the present instance, the compass graduations being laid out in degrees with the cardinal points indicated by the letters "N," "E," "S," and "W," but of course the divisional marks may be varied as desired to indicate the points of the compass. Upon the circumferential surface of the float, that is, the outer flange 36, are compass readings corresponding to those carried by the surface 37 and these compass readings may be observed by looking through the cylinder 11. It will be noted that my improved compass in effect has two compass cards, one on its top surface and one on its circumferential surface and these cards are carried by the same float and within a single bowl, thus providing a simple and compact structure. The float, since it comprises but two parts, each of which may be formed of sheet metal and by a single pressing operation may be manufactured at a relatively low cost. The bottom member 35 of the float has a conical projection 38 located concentrically to and extending into the dome portion of the upper member, and the apex of this conical projection carries a jewel 39 cooperating with the point of the needle 31. Within the float 32 is a magnet 40 preferably of the ring type as shown in Figure 2 so positioned as to maintain the north cardinal point pointing magnetic north. It is, of course, understood that one or more bundles of magnetic needles may be employed within the float. The liquid with which the compass bowl is filled, may be varied, as desired, but, by way of illustration, it may be stated that this liquid consists of 40% grain alcohol and 60% water.

That embodiment of my invention shown in Figure 4 is somewhat similar to that illustrated in Figure 3, but in this case the float 32' is of slightly different construction, and the arrangement of the needle 31' and the jewel 39' is the reverse of that shown in Figure 3. In Figure 4, the compass points, instead of being engraved on the metallic members of the float, are marked on a flat mica ring or card 41 positioned about the dome portion and a mica ring 42 about the sides of the float. The needle 31' is carried by the float and the jewel 39' by the post 30', the jewel being cushioned by a spring 33'.

Arising from the bottom plate 10 or the bridge 29 and bowed about the float 32 are two oppositely disposed lubber lines or arms 43 which are in the same vertical plane as is the zero mark of the azimuth circle 44 hereinafter described. When attaching my improved compass to an airplane or ship, the lubber lines are positioned in alignment with the longitudinal axis of the aircraft or the keel of the ship.

For the purpose of indicating the inclination of the craft on which the compass is carried, the bottom plate 10 carries a pair of rods having horizontally disposed portions 45, curved concentrically to and about the float and forming horizontal lubber lines. It will be seen that when the craft carrying the compass is inclined at an angle with respect to the horizontal plane, the lubber lines 45 become displaced angularly relative to the float so that the inclination of the craft is indicated.

Upon the upper surface of the ring 13 is an azimuth circle 44 marked off in degrees, the zero point of which is in alignment with the vertical lubber lines 43, as stated.

In Figures 1 to 3 the graduation of the azimuth circle are marked directly on the ring 13, while in Figure 4, this circle is marked on a ring 46 located in an annular groove of the ring 13.

Within the ring 13 and maintained in place by a tongue and groove arrangement 47 is a rotatable ring 48 having at diametrically opposite points a rear sight 49 and a front sight 50, each of these sights being pivoted to the ring so that they may be folded down to facilitate packing for shipment of the compasses. Associated with the front sight 50 is an arrow or pointer 51 extending inwardly of the ring 48 and located immediately above the top glass plate 12. The sights 49 and 50 and the pointer 51 each has an index line, and these lines, together with the divisional or compass marks and numerals on the float 32 of Figure 1 and on the mica members 41 and 42 of Figure 4, and the graduations of the azimuth circle 44, are marked with luminous paint and coated over with a suitable transparent lacquer so that these lines and numerals are visible in darkness.

The aviator of an aircraft carrying my improved compass may adjust the compass to indicate the heading which he must take to reach a predetermined destination in the following manner: He, of course, knowns the compass bearing of his craft relative to his destination and decides at what speed he shall fly. The velocity and direction of the wind is then determined and with these factors known or determined, he can, in a manner readily understood, compute the drift of the machine and the direction in which the craft must be apparently headed. The pointer 51 is then brought into such position that, when the machine is correctly headed, the pointer will be over one of the cardinal points of the compass, and thereafter the pointer serves as a lubber line. Presume that an aviator finds that the heading of his machine, that is, the longitudinal axis thereof, will be 30 degrees east of north. The aviator will then head his machine in such a direction that the vertical lubber lines 43 which, as stated, are in a vertical plane passing through the longitudinal axis of the aircraft, will be maintained, referring to Figure 1 of the drawing, in alignment with the numerals 3 and 21 of the compass. The aviator, however, in the place of attempting to remember the direction of the wind, the direction of his destination and the fact that he must keep the lubber lines 43 at certain points on the compass card, will rotate the ring 48 to bring the index pointer 51 to a position thirty degrees in a counter clockwise direction of the forward lubber line 43 and then, while flying, will maintain the craft at such a heading that the divisional line indicating north will be in alignment with the index pointer 51. It will thus be noted that the index pointer 51 becomes, in effect, the lubber line, and that by adjusting this line so that one of the cardinal points may be brought in alignment therewith to indicate the proper heading, the likelihood of the aviator becoming confused, and forgetting the points at which the lubber lines 43 should be on the compass, is eliminated.

If the aviator wishes to take the bearing of his craft while flying, he may employ the sight members 49 and 50 and the azimuth circle 44. For instance, presume he is flying over the water and wishes to get his bearing relative to a promontory or other fixed point. In flying towards the promontory and at a determined time, he would rotate the ring 48 to bring the sights 49 and 50 in alignment with the promontory and note the positions of these sighting members on the azimuth circle. He would then pass the promontory and again take a sighting and note the results and knowing the distance which he has travelled between the two sightings, he can readily determine the position of his craft relative to the promontory.

It will further be noted that my improved compass may be employed as an inclinometer, for when the craft becomes displaced relative to a horizontal plane, the horizontal lubber lines 45 become likewise displaced while the float 32 maintains its horizontal position, and the distance the lubber lines are displaced relative to the float indicates the angle of inclination.

It will further be seen from the foregoing description that the aviator may view the compass card on the periphery of the compass float 32 while in a sitting position by looking through the glass cylinder 11. When he wishes to adjust the compass or to take bearings, in the manner heretofore described, he may rise to a standing position and then view the top compass card through the top transparent plate 12.

It is to be understood that the present disclosure of my invention is by way of illustration only, and is not restrictive thereof, the invention being susceptible to various modifications which would be within the spirit of my conception without departing from the scope of the following claims.

What I claim is:

1. A magnetic compass having a compass bowl, a float within the bowl and having graduations on its upper surface indicative of the points of the compass, an azimuth circle on the top of the bowl, and a rotatable ring carried by said bowl and having oppositely disposed sights, cooperating with said azimuth circle.

2. A magnetic compass having a compass bowl, a float within the bowl and having graduations on its upper surface indicative of the points of the compass, an azimuth circle on the top of the bowl, a rotatable ring carried by said bowl and having oppositely disposed sights cooperating with said azimuth circle, and an index member carried by the ring and positioned above said compass card.

Signed at Washington, District of Columbia, this 14th day of February, 1919.

JAMES P. WARBURG.